United States Patent [19]

Batzar

[11] Patent Number: 5,250,356
[45] Date of Patent: Oct. 5, 1993

[54] COOKWARE COATING SYSTEM

[75] Inventor: Kenneth Batzar, Cherry Hill, N.J.

[73] Assignee: E. I. Du Pont de Nemours and Company, Wilmington, Del.

[21] Appl. No.: 937,925

[22] Filed: Aug. 28, 1992

[51] Int. Cl.$^5$ .......................... B32B 15/08; B05D 1/36
[52] U.S. Cl. ................................... 428/421; 427/203; 427/205; 427/409; 427/419.2; 428/422; 428/458; 428/463
[58] Field of Search ............... 428/421, 422, 458, 463; 427/409, 419.2, 203, 205

[56] References Cited

U.S. PATENT DOCUMENTS 3,936,569  2/1976  Miller et al. ..................... 428/463
4,180,609  12/1979  Vassiliou .......................... 428/422

Primary Examiner—Thomas J. Herbert, Jr.
Attorney, Agent, or Firm—Richard H. Burgess

[57] ABSTRACT

Metal cookware coated with a multilayer system including a primer with more $Al_2O_3$ and a blend of PTFE and PFA or FEP, a midcoat with less $Al_2O_3$, and a topcoat with PTFE, and processes for preparing such coating systems.

12 Claims, No Drawings

COOKWARE COATING SYSTEM

BACKGROUND

This invention relates to coated cookware. More particularly, it relates to such cookware with a scratch-resistant non-stick coating.

It has long been desirable to provide cookware with non-stick coatings which are resistant to scratching. Prior efforts have included using harder auxillary heat resistant resins along with the perfluorocarbon polymer resins such as polytetrafluoroethylene (PTFE) and copolymers such a tetrafluoroethylene and hexafluoropropylene, known as fluorinated ethylene-propylene (FEP), or perfluoroalkyl vinyl ether copolymer with tetrafluoroethylene. Although various pigments and fillers including mica and colloidal silica have been used, both in cookware and industrial coatings, ideal scratch-resistant cookware coatings have not been achieved.

SUMMARY OF THE INVENTION

The present invention provides an article of cookware comprising a metal substrate coated with a scratch-resistant non-stick coating system wherein said coating system comprises a primer applied to a metal substrate, a midcoat ahered to said primer and a topcoat adhered to said midcoat, said primer comprising about 15 to 35 percent by weight calcined aluminum oxide in the form of particles with an average diameter under 20 microns, about 35 to 70 percent by weight perfluorocarbon polymer comprising 50 to 70 percent by weight polytetrafluoroethylene and 50 to 30 percent by weight copolymer selected from fluorinated ethylene-propylene and perfluoroalkyl vinyl ether copolymer with tetrafluroethylene, and about 15 to 30 weight percent auxillary heat stable polymer selected from polyamide-imide, polyphenylene sulfide and polyether sulfone, said midcoat comprising about 10 to 20 percent by weight of such aluminum oxide, and 90 to 80 percent by weight of such perfluorocarbon polymer but in a ratio in the range of 80 to 90 percent by weight polytetrafluoroethylene and 20 to 10 percent by weight of such copolymer, and said topcoat comprises polytetrafluoroethylene.

The invention also provides processes to produce such coatings on the substrates. The primer is applied by conventional processes such as spraying and dried by removing essentially all the water to prevent strike-in, the primer giving a dry film thickness (DFT) in the range of 13 to 22.5 $\mu$m, preferably 17.5 to 20 $\mu$m. Then the midcoat and topcoat are applied wet-on-wet without significant drying between coats to a total coating thickness preferably of 32.5 to 45 $\mu$m DFT with a topcoat DFT of preferably 7.0 to 10 $\mu$m with the midcoat making up the balance preferably at 7.5 to 10 $\mu$m DFT equivalent. Preferably the primer has a DFT of 1.5 to 2 times the DFT of the midcoat.

DETAILED DESCRIPTION OF THE INVENTION

The invention relates to the use of high percentages of small particle size (average <10 $\mu$m or preferably about 3 to 5 $\mu$m) calcined aluminum oxide ceramic at 25-35% in the primer coat while still retaining adhesion to the substrate at film builds much higher than achievable with primer not containing ceramic, 20 $\mu$m versus 13 $\mu$m. (Parts, proportions and ratios herein are by weight except where indicated otherwise). The ability to obtain these film thicknesses without blistering is coupled with the incorporation of the same aluminum oxide in the midcoat at 10-25%. The copolymer permits retaining intercoat adhesion between midcoat and primer. The combination maximizes the higher percentage loading in the highest film build coating in the system, the primer. The primer contains a blend of fluoropolymer homopolymer/copolymer (60/40 ratio preferred) of PTFE/FEP or PFA to achieve adhesion in the primer, and the midcoat contains a homopolymer/copolymer blend (85/15 ratio preferred) of PTFE/PFA, to retain intercoat adhesion. The improvements over current systems have been determined by use of a cooking test designated AIHAT (Accerlated In-Home Abuse Test), described below.

The following tables show the ingredients preferably used to make the three coatings. The % Dry Basis is the amount in the final coating system. The Wet Basis on the formulations used has not been normalized to percentages. The % Solids refers to the formulations. These are mixed and applied by techniques well known in the art. Substrates can be prepared by known techniques, such as etching, sand or grit blasting, frit coating, hardcoat anodization, flame or plasma spraying, or combinations of these. The substrate used in the present tests had been grit blasting to a surface profile of 4.5 to 5 $\mu$m. The PTFE used is Du Pont dispersion T30. The FEP used is Du Pont dispersion TE 9075. The PFA used has a melt viscosity of about 20 to $40 \times 10^5$ poises. The primer is dried to remove the water before applying the midcoat and topcoat, and the topcoat is applied to the midcoat without a need to dry the midcoat first. After the coating system is applied it is cured by conventional techniques, such as at 427° C. for 5 mins. The amounts applied for each coat are adjusted to give the desired DFT's. Although it can be difficult to measure the DFT's of the primer and midcoat separately after curing, during manufacture the DFT of the primer is known. The DFT of the topcoat is easily measured.

|  | PARTS WET BASIS | % SOLIDS | % DRY BASIS |
| --- | --- | --- | --- |
| PRIMER | | | |
| Furfural alcohol | 1.6 | — | — |
| Amine salt of polyamic acid | 15.9 | 29 | 18.24 |
| Deionized water | 40.8 | — | — |
| PTFE Dispersion | 10.9 | 60 | 25.90 |
| FEP Disperion | 8.1 | 55 | 17.65 |
| Aluminum Oxide Dispersion | 12.0 | 50 | 23.75 |
| Ultramarine Blue Disperion | 3.0 | 52 | 6.17 |
| Iron Oxide Disperion | 0.3 | 55 | 0.66 |
| Carbon Black Dispersion | 4.1 | 25 | 4.07 |
| Colloidal Silica | 3.2 | 30 | 3.56 |
|  |  |  | 100.00 |
| MIDCOAT | | | |
| PTFE Dispersion | 47.6 | 60.0 | 67.11 |
| PFA | 8.4 | 60.0 | 11.84 |
| Carbon Black dispersion | 4.2 | 25.0 | 2.47 |
| Deionized water | 4.2 | — | — |
| Aluminum oxide dispersion | 13.5 | 50.0 | 15.86 |
| Ultramarine blue dispersion | 0.5 | 52.0 | 0.61 |
| Cerium octoate, surfactant solution | 10.5 | 5.0 | — |
| Acrylic dispersion-decomposable polymer | 10.2 | 40.0 | — |
| TiO$_2$ coated mica flake | 0.9 | — | 2.11 |
|  |  |  | 100.00 |
| TOPCOAT | | | |
| PTFE Dispersion | 71.5 | 60.0 | 99.0 |

|  | PARTS WET BASIS | % SOLIDS | % DRY BASIS |
|---|---|---|---|
| Deionized water | 2.0 | — | — |
| TiO$_2$ coated mica | 0.4 | — | 1.0 |
| Cerium octoate, surfactant solution | 12.0 | 5.0 | — |
| Acrylic dispersion-decomposable polymer | 13.4 | 40.0 | — |

The AIHAT test involves a series of high heat (246°–274° C.) cooking cycles using common household metal cooking utensils (fork, spatula, whisk, knife). The invention provides the best overall scratch and mar resistance when compared to prior commercial cookware coating systems. Marring is apparent scratching that does not actually deform the coating substantially. It is seen visually as about the same as real scratching and is treated as the same herein. The reinforced high build primer combined with a reinforced midcoat allows for the application of a conventional topcoat which provides release and yet shows reduced scratching.

AIHAT PROCEDURE

PROCEDURE 1—EGGS

A. Pour whole egg into center of pan set at 260°–274° C. Fry egg 3 minutes. Flip with metal spatula. Fry other side for 1 minute. Flip egg 5 additional times. Cut egg into 9 equal pieces with knife. Record temperature. Remove egg. (All flipping with spatula should be done with a single stroke).

B. Use 120 cc 1B mixture (described below). Pour into frypan. Scramble with tines of 4-tined fork using circular motion, 60 cycles. Maintain 90 degree angle of fork to frypan. Remove egg from pan with high pressure hot water.

PROCEDURE 2—HAMBURGER AND TOMATO SAUCE

A. Set pan to 246°–260°. Fry thawed ¼ hamburger 3 minutes. Flip with metal spatula. Cook 1 minute. Set hamburger to side of pan. Stir with metal fork on coating surface in "Z" motion ten times. Reverse "Z" 10 times, 90 degree angle of fork.

B. Add 180 cc Tomato Sauce 2B (described below). Cook to reduce volume to ⅓ stirring with whisk edges, using zigzag motion 50 times.

A contact pyrometer is used to measure the temperature at a point midway between the center of the pan and the side wall where the handle is attached.

Two dishwasher cycles are carried out with 10 cycles of cooking. The first diswashing is done during the 10 cooking cycles and the second at the end of the 10 cooking cycles. Then the AIHAT ratings are made.

1B. Mixture
470 cc water
2 dozen eggs
120 g salt
Mix in blender.

2B. Tomato Sauce
945 cc sauce
120 g salt
Dilute with water to 3.8 liter of preparation
Mix thoroughly.

AIHAT TEST RESULTS

Numerical basis rating 0–10, 10 best, based on judgment of experienced tester.

|  | Scratch Resistance |
|---|---|
| System A | 3–4 |
| System B | 5–6 |
| System C | 7–8 |
| This Invention | 9 |

I claim:

1. An article of cookware comprising a metal substrate coated with a scratch-resistant, non-stick coating system wherein said coating system comprises a primer applied to a metal substrate, a midcoat adhered to said primer and a topcoat adhered to said midcoat, said primer comprising about 15 to 35 percent by weight calcined aluminum oxide in the form of particles with an average diameter under 20 microns, about 35 to 70 percent by weight perfluorocarbon polymer comprising 50 to 70 percent by weight polytetrafluoroethylene and 50 to 30 percent by weight copolymer selected from fluorinated ethylene-propylene and perfluoroalkyl vinyl ether copolymer with tetrafluoroethylene, and about 15 to 30 weight percent auxillary heat stable polymer selected from polyamide-imide, polyphenylene sulfide and polyether sulfone, said midcoat comprising about 10 to 20 percent by weight of such aluminum oxide, 90 to 80 percent by weight of such perfluorocarbon polymer but in a ratio in the range of 80 to 90 percent by weight polytetrafluoroethylene and 20 to 10 percent by weight of such copolymer, and said topcoat comprises polytetrafluoroethylene.

2. The article of claim 1 wherein the perfluorocarbon polymer of the primer comprises about 55 to 65 percent polytetrafluoroethylene and about 45 to 35 percent copolymer.

3. The article of claim 2 wherein the perfluorocarbon polymer of the primer comprises about 60 percent polytetrafluoroethylene and about 40 percent copolymer.

4. The article of claim 2 wherein the copolymer is fluorinated ethylene-propylene.

5. The article of claim 4 wherein the copolymer is perfluoroalkyl vinyl ether copolymer with tetrafluoroethylene.

6. The article of claim 1 wherein the perfluorocarbon polymer of the midcoat comprises about 85 percent polytetrafluoroethylene and about 15 percent of such copolymer.

7. The article of claim 6 wherein the copolymer is fluorinated ethylene-propylene.

8. The article of claim 6 wherein the copolymer is perfluoroalkyl vinyl ether copolymer with tetrafluoroethylene.

9. A process of producing the article of claim 1 wherein the primer is applied by spraying and is dried before applying the midcoat and the system is cured at elevated temperature after the coating system has been applied.

10. The process of claim 9 wherein the formulations sprayed onto the dried primer to form the midcoat and topcoat include a decomposable polymer and an oxidation catalyst that aids in the decomposition of such polymer during curing.

11. The process of claim 9 wherein the dry film thickness (DFT) of the primer is about 13 to 22.5 $\mu$m and the DFT of the coating system is about 32.5 to 45 $\mu$m.

12. The process of claim 11 wherein the DFT of the primer is 1.5 to 2.0 times the DFT of the midcoat.

* * * * *